(12) United States Patent
Sullivan

(10) Patent No.: US 7,203,865 B2
(45) Date of Patent: Apr. 10, 2007

(54) APPLICATION LEVEL AND BIOS LEVEL DISASTER RECOVERY

(75) Inventor: Gary E. Sullivan, Trabuco Canyon, CA (US)

(73) Assignee: Gateway Inc., Irvine, CA (US)

( * ) Notice: Subject to any disclaimer, the term of this patent is extended or adjusted under 35 U.S.C. 154(b) by 554 days.

(21) Appl. No.: 10/128,111

(22) Filed: Apr. 23, 2002

(65) Prior Publication Data
US 2003/0200482 A1    Oct. 23, 2003

(51) Int. Cl.
*G06F 11/00* (2006.01)
(52) U.S. Cl. ............................. 714/38; 714/25; 714/36
(58) Field of Classification Search ................. 714/2, 714/38, 25, 6, 36
See application file for complete search history.

(56) References Cited

U.S. PATENT DOCUMENTS

| | | | | |
|---|---|---|---|---|
| 4,377,000 | A | 3/1983 | Staab | 371/11 |
| 5,704,031 | A | 12/1997 | Mikami et al. | 395/182.02 |
| 5,884,073 | A * | 3/1999 | Dent | 713/2 |
| 5,907,672 | A | 5/1999 | Matze et al. | 395/182.06 |
| 5,930,824 | A | 7/1999 | Anglin et al. | 711/162 |
| 5,938,775 | A | 8/1999 | Damani et al. | 714/15 |
| 5,949,970 | A | 9/1999 | Sipple et al. | 395/182.13 |
| 6,006,331 | A | 12/1999 | Chu et al. | 713/201 |
| 6,044,444 | A | 3/2000 | Ofek | 711/162 |
| 6,128,555 | A | 10/2000 | Hanson et al. | 701/13 |
| 6,182,086 | B1 | 1/2001 | Lomet et al. | 707/202 |
| 6,205,565 | B1 | 3/2001 | Bissett et al. | 714/49 |
| 6,208,918 | B1 | 3/2001 | Ando et al. | 701/35 |
| 6,230,285 | B1 | 5/2001 | Sadowsky et al. | 714/14 |
| 6,259,442 | B1 * | 7/2001 | Britt et al. | 715/721 |
| 6,298,443 | B1 * | 10/2001 | Colligan et al. | 713/200 |
| 6,393,559 | B1 | 5/2002 | Alexander | |
| 6,487,464 | B1 * | 11/2002 | Martinez et al. | 700/79 |
| 6,560,726 | B1 * | 5/2003 | Vrhel et al. | 714/55 |
| 6,754,855 | B1 * | 6/2004 | Denninghoff et al. | 714/48 |
| 6,829,732 | B2 * | 12/2004 | Whiteside et al. | 714/38 |
| 2004/0025003 | A1 * | 2/2004 | Stevens | 713/2 |

* cited by examiner

*Primary Examiner*—Robert Beausoliel
*Assistant Examiner*—Marc Duncan
(74) *Attorney, Agent, or Firm*—Scott Charles Richardson; McGrath, Geissler, Olds & Richardson

(57) ABSTRACT

The present invention is directed to a BIOS level and application level recovery of an information handling system. A method for recovering from a failure of an information handling system may include monitoring an information handling system, the information handling system utilizing at least one item of software. Failure of at least one item of software utilized by the information handling system is detected and an application level component of a recovery utility to correct the detected failure is initiated. The initiated application level component of the recovery utility is at least one of unsuccessful in correcting the detected failure and unavailable, a BIOS level component of the recovery utility begins a recovery process.

23 Claims, 6 Drawing Sheets

APPLICATION LEVEL AND BIOS LEVEL DISASTER RECOVERY

FIELD OF THE INVENTION

The present invention generally relates to the field of information handling systems, and particularly to a system and method for application level, such as operating systems and programs, and BIOS level disaster recovery in an information handling system.

BACKGROUND OF THE INVENTION

Software failure of an information handling system is one of the most troublesome and problematic hindrances to full consumer satisfaction of the information handling system. Operating system (OS) failures, application crashes and executable errors may interrupt workflow in both home and business settings, causing a great expense in time and money for the consumer.

For example, in the case of a program failure, a user may be required to manually reinstall the application, which may involve locating removable media on which the program is stored, engage in an involved installation process, as well as configuring the program as previously set-up by the consumer, not to mention the actual loss of the data that was being manipulated by the consumer at the time of failure.

In the instance of an operating system failure, recovery may be even more challenging. Loss of an operating system may not only result in problems with the operating system itself, but also with application utilizing the operating system. Thus, an operating system failure may proliferate into other applications, thereby causing an even greater challenge to correct. Further, corrective actions taken to reinstall an operating system may result in loss of system settings, as well as require reinstallation of other programs on the information handling system that may become corrupted.

Therefore, there is a need for improved systems and methods for recovery of software of an information handling system.

SUMMARY OF THE INVENTION

Accordingly, the present invention is directed to a BIOS level and application level recovery of an information handling system. By utilizing the present invention, successive methods of software recovery may be implemented in a manner targeted to restore operation of the system efficiently. Thus, if a failure is detected, which may include receiving a report of a software failure, a less drastic approach may be attempted, such as "patching" the software, before a more drastic approach is implemented, such as a "scorched earth" recovery.

In a first aspect of the present invention, a method for recovering from a failure of an information handling system includes monitoring an information handling system, the information handling system utilizing at least one item of software. Failure of at least one item of software utilized by the information handling system is detected and an application level component of a recovery utility to correct the detected failure is initiated. If the initiated application level component of the recovery utility is at least one of unsuccessful in correcting the detected failure and unavailable, a BIOS level component of the recovery utility begins a recovery process.

In a second aspect of the present invention, a system for recovering from a failure of an information handling system includes a memory suitable for storing a program of instructions and a processor communicatively coupled to the memory. The program of instructions configures the processor to monitor the information handling system, the information handling system utilizing at least one item of software and detect failure of at least one item of software utilized by the information handling system. An application level component of a recovery utility is initiated to correct the detected failure. In which, the initiated application level component of the recovery utility is at least one of unsuccessful in correcting the detected failure and unavailable, a BIOS level component of the recovery utility begins a recovery process.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, embodiments of the present invention are shown. Information handling systems, such as residential gateway, connected touch pads, desktop computers, notebook computers, digital information appliance, convergence systems, and the like, may encounter a variety of software failures. These failures may range from corruption of binaries or data associated with one or more functions of a system, to a total failure of the operating system. Thus, there is a range of associated corrective actions, from repairing data file and reinstalling binaries, to rewriting the entire contents of a file system to restore the operating system and all application.

One such method of restoring the entire contents of a file system is referred to as "scorched earth," and may involve a process that loads from outside the file system and may run without OS support. For example, a BIOS function may be provided that detects that a system has encountered a failure and cannot be restarted, invokes a contained dialup or network connection to a back office, and retrieves and rewrites an image of the file system, such as how the system was shipped, an image taken as a back-up, and like images as contemplated by a person of ordinary skill in the art.

Another type of correction action includes an application that may detect function failure (such as due to file corruption), such down the process, reinstall the application and/or restore the application data, and restart the application. Typically, this method requires a functioning operating system on the system, and is typically not able to replace the operating system.

Figure 1:
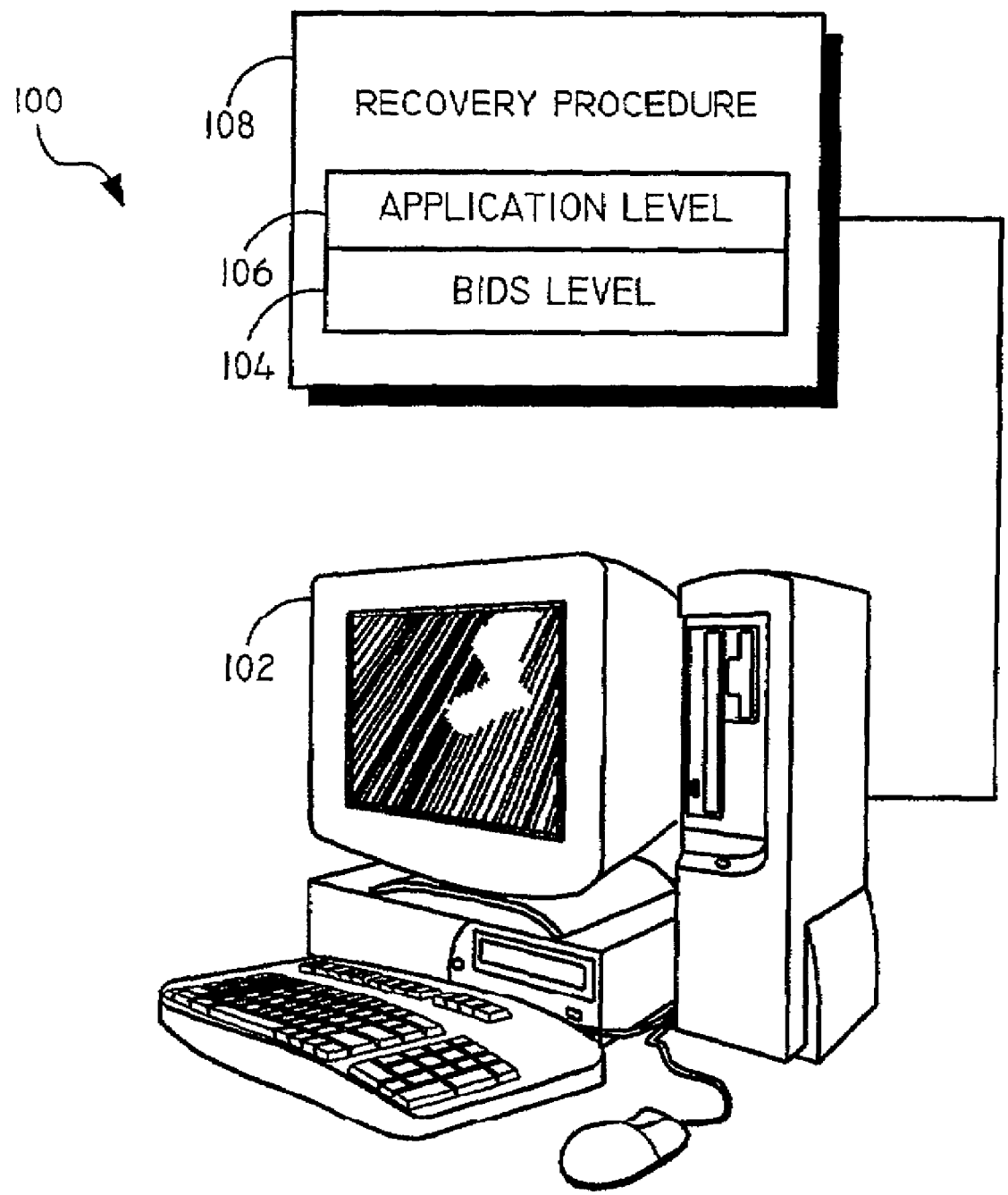
FIG. 1 is an illustration of an embodiment of the present invention wherein a recovery utility suitable for providing application level and sub-application level recovery is shown.

Referring now to FIG. 1, an embodiment 100 of the present invention is shown wherein a recovery utility is suitable for providing application level and sub-application level recovery. An information handling system 102 includes a BIOS level 104 and application level 106 processes. The BIOS level 104 may include an ability to perform a power on self test (POST) for different hardware components in the system 102 to determine if the components are functioning properly and may be included on a variety of different components in the system 102, such as graphics cards, interface cards, and the like. Additionally, the BIOS level 104 may include low-level routines utilized by an operating system to interface with hardware devices, such as a keyboard, screen, ports, and the like, as well as manage settings for system devices, such as hard disks, clock, and the like.

An application level 106 of the information handling system 102 may include an operating system, programs designed to assist in performance of a specific task, such as a word processor, browser, email, and the like, and other applications as contemplated by a person of ordinary skill in the art. Thus, the application level 106 may be considered to operate at a "higher" operating level in the system 102 than the BIOS level 104.

The present invention provides a recovery utility 108 that may encompass both the application level 106 and BIOS level 104 of software of an information handling system 102. Therefore, if a failure is detected, the present invention may provide both the ability to attempt to fix an application as well as an ability to employ more drastic methods of file recovery, such as a "scorched earth" recovery.

Figure 2:
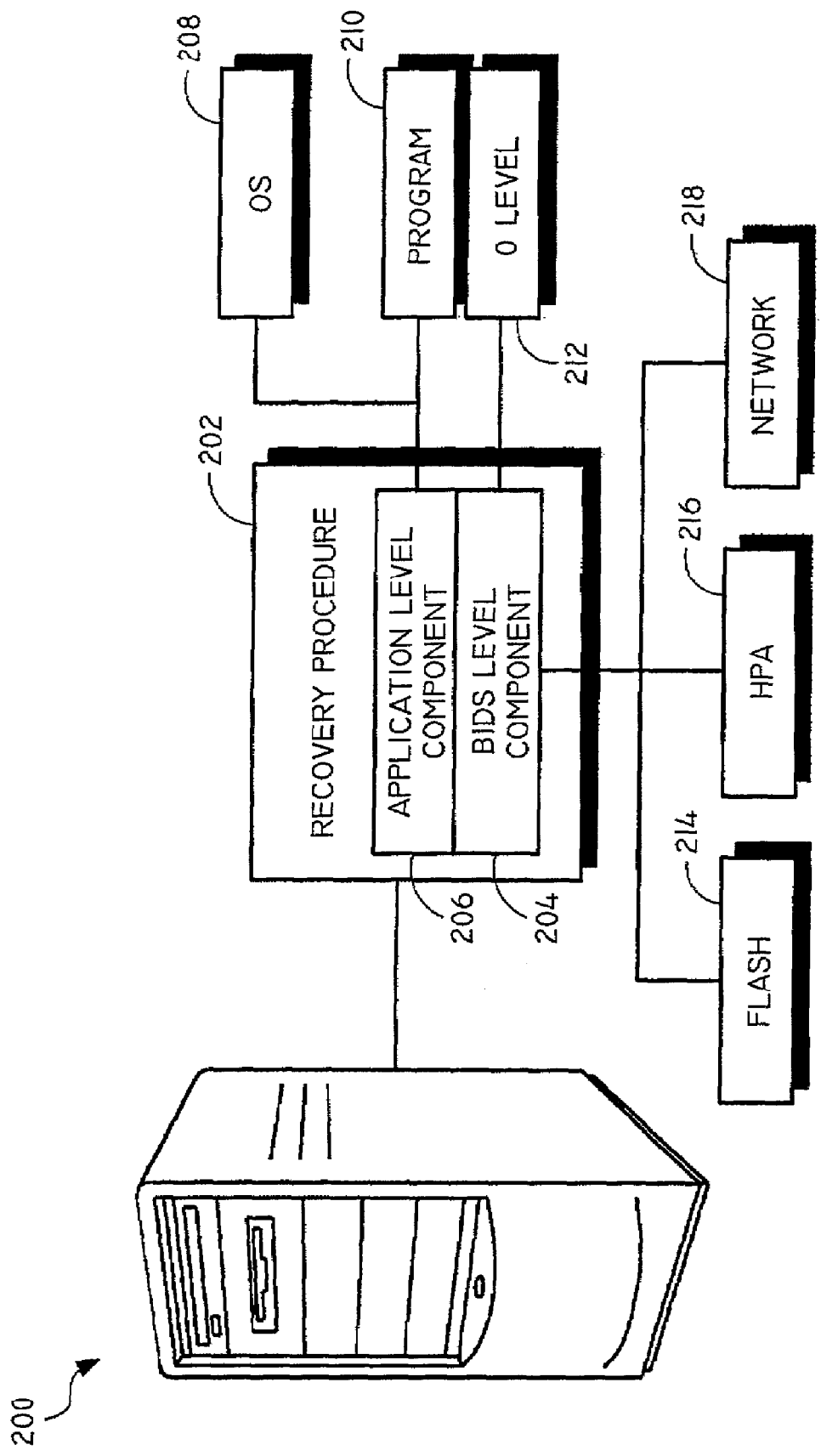
FIG. 2 is an illustration of an embodiment of the present invention wherein an exemplary recovery utility encompassing both application level and BIOS level recovery is shown.

For example, as shown in FIG. 2, an exemplary recovery utility 202 of the present invention is illustrated. A system 200 incorporating a recovery utility 202 of the present invention may include both a BIOS level component 204 and an application level component 206. The application level component 206 is suitable for performing corrective actions for applications, such as operating systems 208, programs 210, and the like. The BIOS level component 208 is suitable for performing corrective actions for sub-application level, i.e. zero level, software of an information handling system, restore application level software that is not able to be restored at the application level, such as in the case of an operating system failure, and like actions as contemplated by a person of ordinary skill in the art.

The BIOS level component 208 may be stored in such a manner as to be accessible in the case of operating system failure and other memory device failure, such as stored in a flash memory 214, host protected area 216 of a hard disk drive, and the like. Additionally, network connection information 218, such as the information needed to implement a network connection, may be stored in such a manner as to be accessible in the event of operating system failure to enable the information handling system to obtain desired files. For example, dialup connection information may be stored to enable the information handling system to access a network connection even in the event of operating system failure to enable the operating system to be restored, such as from a stored disk image and the like.

Figure 3:
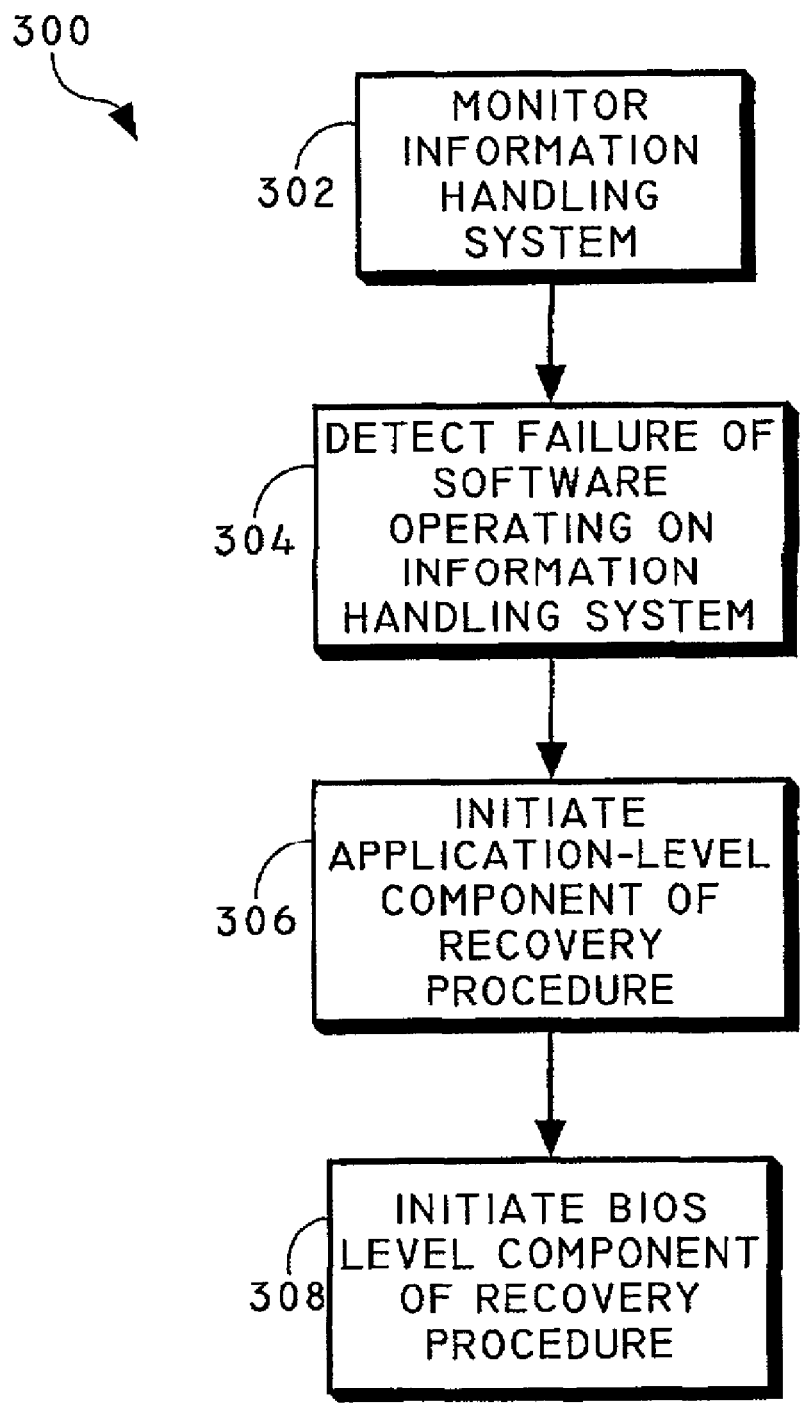
FIG. 3 is a flow diagram illustrating an exemplary method of the present invention wherein a recovery utility including a BIOS level component and an application level component is provided to correct a software failure.

Referring now to FIG. 3, an exemplary method 300 of the present invention is shown wherein a recovery utility including a BIOS level component and an application level component is provided to correct a software failure. Operation of an information handling system is monitored 302, such as monitoring software operational on the information handling system. A failure of an item of software operating on the information handling system is detected 304, which may include failure and inaccessibility of a currently active application, failure to load an application, and the like as contemplated by a person of ordinary skill in the art.

An application level component of a recovery utility is initiated 306 to respond to the detected failure. For instance, an application level component may attempt to diagnose and repair the detected failure. Additionally, a BIOS level component of the recovery utility may be invoked 308 to repair the software. The selection of when to invoke each component may be chosen by successive levels of intrusiveness in order to save as much data as possible and correction the problem as desired.

Figure 4:
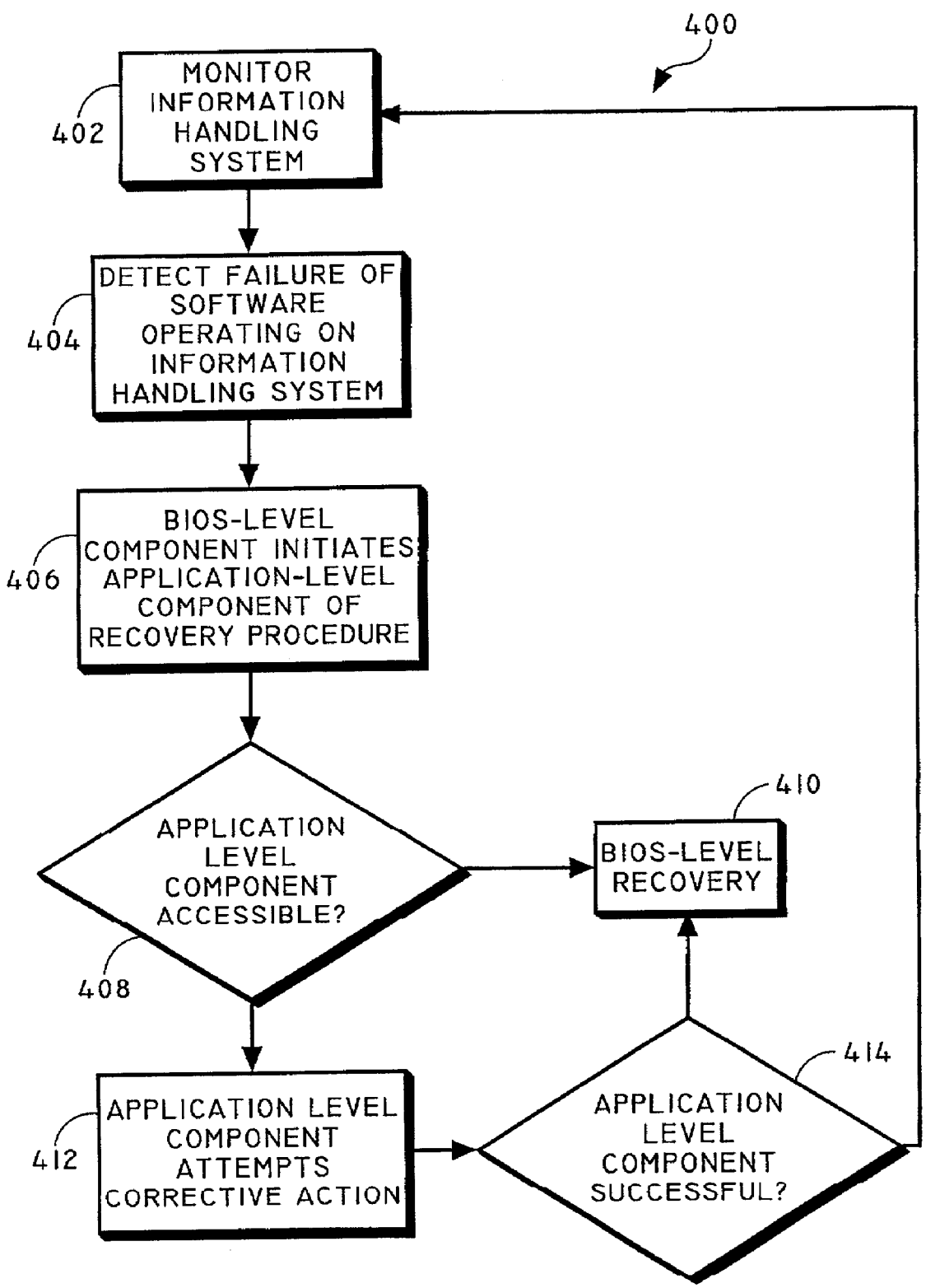
FIG. 4 is a flow diagram illustrating an exemplary method of the present invention wherein a recovery utility initiates an application level component and then a BIOS level component if needed to perform corrective actions in response to a software failure.

For instance, referring now to FIG. 4, an exemplary method 400 of the present invention is shown wherein a recovery utility initiates an application level component and then a BIOS level component if needed to perform corrective actions in response to a software failure. An information handling system may be monitored 402, such as by a BIOS level component of a recovery utility of the present invention, to ensure accessibility of the recovery utility even in the event of operating system failure. A failure is detected of software operating on the information handling system 404, such as a program, operating system and the like. In response to the detected failure, the BIOS level component initiates an application level component of the recovery utility 406. If the application level component is not accessible 408, the BIOS level component initiates a BIOS level recovery 410, such as a "scorched earth" recovery, reinstallation of an operating system, and the like.

If the application level component is accessible 408, the application level component attempts corrective action 412, such as by replacing files, repairing file hierarchies, and like methods as contemplated by a person of ordinary skill in the art. If the application level component is successful 414 in recovering from the software failure, the BIOS level component may continue to monitor the information handling system 402. However, if the application level component is not successful 414, a BIOS level recovery may then be initiated 410.

Thus, if a failure occurs, a recovery utility of the present invention may first attempt to invoke the application level component and have this component attempt to diagnose and repair the failure. If the application level component cannot repair the failure, it may report this failure to the BIOS level component, which may then invoke a more drastic and intrusive action of replacing the entire contents of the file system, and the like as contemplated by a person of ordinary skill in the art. In this way, quicker, more efficient and less intrusive methods of attempting a correction may be attempted first, and if not successful, more intrusive methods attempted in a desired order.

Figure 5:
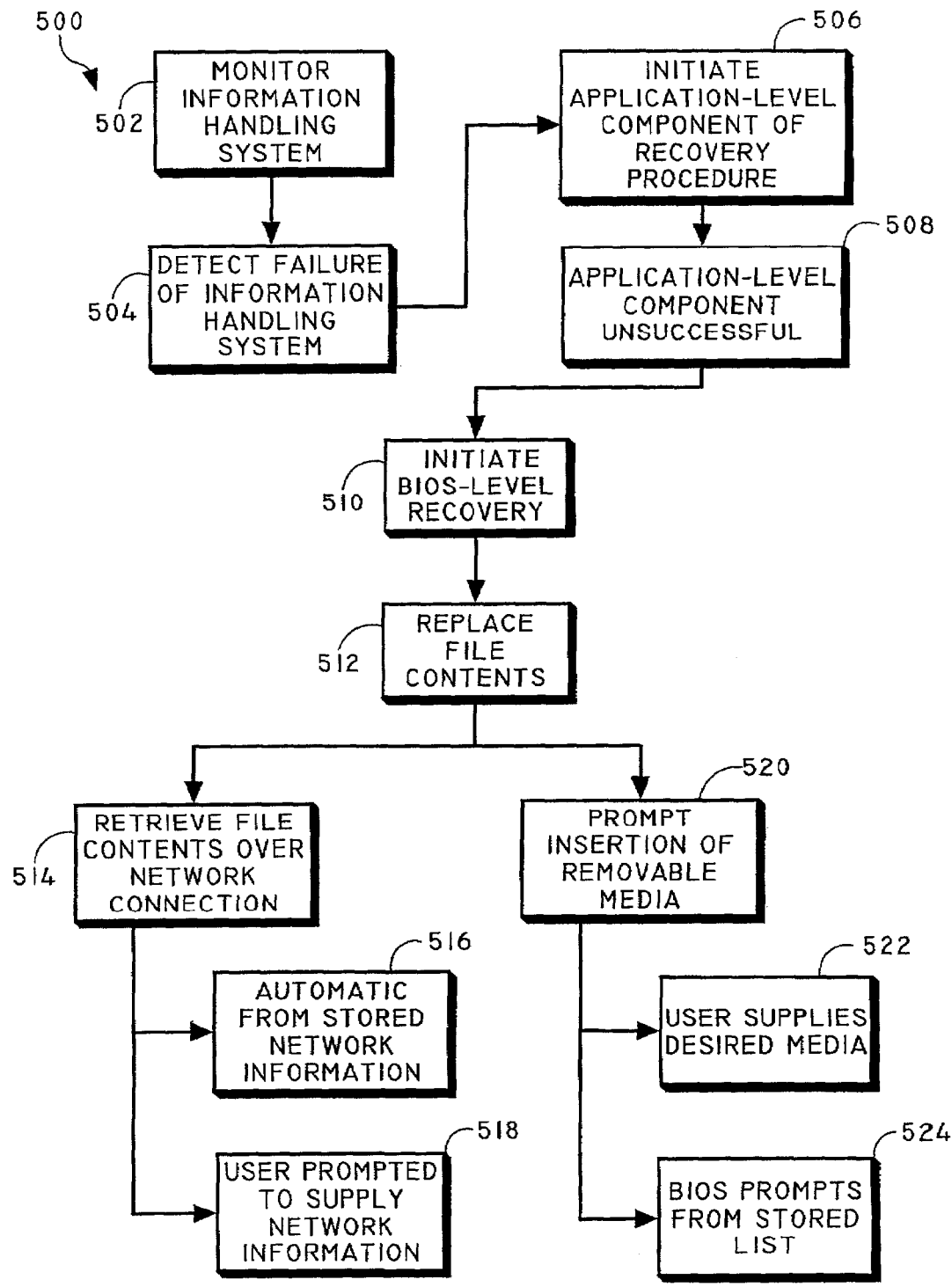
FIG. 5 is a flow diagram depicting an exemplary method of the present invention wherein a recovery utility first initiates an application level component in response to a software failure, which if unsuccessful, a BIOS level component is initiated.

Referring now to FIG. 5, an exemplary method 500 of the present invention is shown wherein a recovery utility first initiates an application level component in response to a software failure, which if unsuccessful, a BIOS level component is initiated. As before, an information handling system is monitored 502 and a failure is detected 504. An application level component of a recovery utility is initiated 506, and is not successful in correcting the failure 508.

Therefore, a BIOS level recovery is initiated which includes replacing file content 512. There are a variety of file replacement methods contemplated by the present invention without departing from the spirit and scope thereof. For example, file contents may be retrieved over a network connection 514. The network connection may be automatically initiated from network connection data stored by an information handling system 516, such as described in relation to FIG. 2. Additionally, a user may be prompted to supply network connection data 518, such as a dialup number, LAN settings, and the like.

Replacing file content 512 may also include retrieval from removable media, and a system of the present invention may prompt a user for insertion of a removable media 520. For example, a user may supply media having the desired software 522 to be installed on the information handling system; a BIOS component of the present invention may prompt a user for media from a stored listing of application previously installed on the information handling system 524, and the like without departing from the spirit and scope of the present invention. Thus, a file content rewrite may be provided in a variety of ways, the optimal choice of which may depend on such factors as available storage, network connectivity, and the like by a person fo ordinary skill in the art. Additionally, successive corrective actions may be determined dynamically, such as based on available system resources, such as memory, network connection, and the like.

Figure 6:
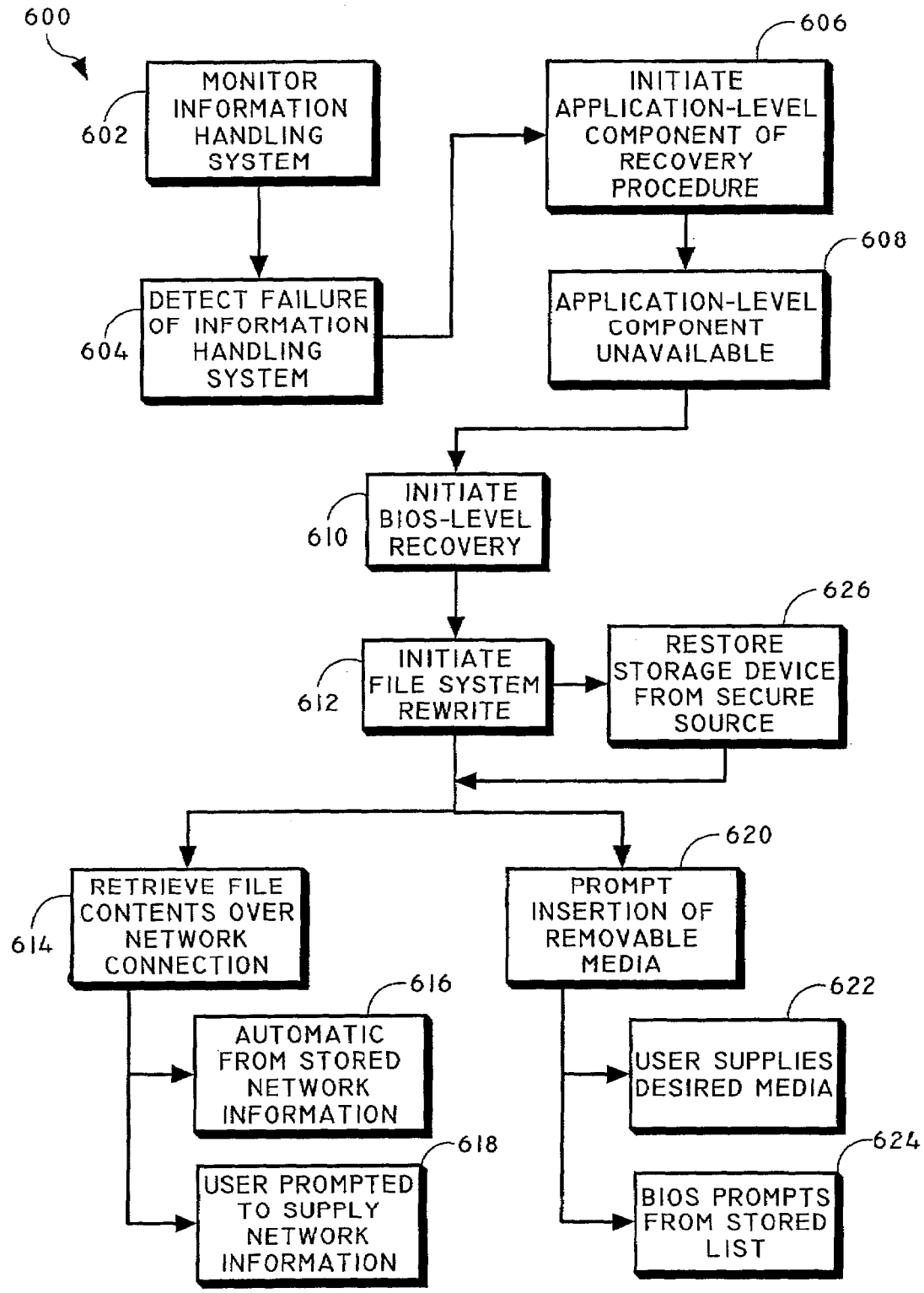
FIG. 6 is a flow diagram of an exemplary method of the present invention wherein a BIOS level component recovery of a recovery utility is initiated due to unavailability of an application level component.

Referring now to FIG. 6, an exemplary method 600 of the present invention is shown wherein a BIOS level component recovery of a recovery utility is initiated due to unavailability of an application level component. An information handling system is monitored 602 and a failure of the information handling system detected 604. An application level component of a recovery utility is initiated 606, but the application level component is unavailable 608. For example, the application level component may not accessible by the BIOS level component due to malfunction of an operating system, and the like.

Therefore, BIOS level recovery 610 is initiated by the BIOS level component, including the launch of a file system rewrite 612. A file system rewrite may be implemented in a manner similar to replacing file content as described previously. For example, file contents may be retrieved over a network connection 614 for rewriting. The network connection may be automatically initiated from network connection data as stored by an information handling system 616, a user may be prompted to supply network connection data 618, and the like.

Additionally, file content for a file system rewrite may be retrieved from removable media, and therefore, a system of the present invention may prompt a user for insertion of a removable media 620. For example, a user may supply media having the desired software 622 to be installed on the information handling system; a BIOS component of the present invention may prompt a user for media from a stored listing of application previously installed on the information handling system 624, and the like without departing from the spirit and scope of the present invention.

Further, restoration of an electronic data storage device may be initiated by the BIOS level component 626 from data stored in a secure location on the information handling system. For example, restorative data and utilities may be stored on a host protected area (HPA) and accessed by a BIOS level component of the present invention to restore operation of the electronic data storage device in the event of a catastrophic failure. Further discussion of the use of a HPA may be found in U.S. patent application Ser. No. 09/648,838, filed Aug. 25, 2000, which is herein incorporated by reference in its entirety.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc for utilization in a CD-ROM drive and/or digital video disc (DVD) drive, a compact disc such as a compact disc-rewriteable (CD-RW), compact disc-recordable and erasable; a floppy disk for utilization in a floppy disk drive; a floppy/optical disc for utilization in a floppy/optical drive; a memory card such as a memory stick, personal computer memory card for utilization in a personal computer card slot, and the like. Further, the set of instructions can be stored in the memory of an information handling system and transmitted over a local area network or a wide area network, such as the Internet, when desired by the user.

Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for recovering from a failure of an information handling system, comprising:

monitoring an operational information handling system, the information handling system utilizing at least one item of software;

monitoring the at least one item of software;

detecting failure of the at least one item of software utilized by the information handling system, wherein the failure of the at least one item of software is detected utilizing a BIOS level monitoring component of a recovery utility;

initiating an application level component of the recovery utility to correct the detected failure; and detecting whether the application level component of the recovery utility failed to correct the detected failure;

wherein if the initiated application level component of the recovery utility is at least one of unsuccessful in correcting the detected failure and unavailable, initiating a BIOS level recovery component of the recovery utility to begin a recovery process.

2. The method as described in claim 1, wherein if the application level component is unavailable, the initiated BIOS level recovery component of the recovery utility initiates a file system rewrite.

3. The method as described in claim 2, wherein the file system rewrite includes a scorched earth recovery.

4. The method as described in claim 3, wherein files are obtained for the file system rewrite from at least one of a network connection and removable medium.

5. The method as described in claim 4, wherein a network connection to obtain the files is initiated by data stored in a host protected area accessible to the BIOS level recovery component.

6. The method as described in claim 1, wherein if the application level component is unsuccessful, the initiated BIOS level recovery component of the recovery utility initiates a file content replacement.

7. The method as described in claim 1, wherein the application level component is suitable for repairing applications including at least one of an operating system and a program designed to assist in performance of a specific task.

8. The method as described in claim 1, wherein the BIOS level recovery component is suitable for functioning in absence of a functioning operating system on the information handling system.

9. The method as described in claim 1, wherein correcting includes at least one of shutting down the failed item of software, reinstalling the item of software, restoring the item of software and restarting the item of software.

10. The method as described in claim 1, wherein the monitoring the at least one item of software is performed by the BIOS level monitoring component of the recovery utility.

11. A system for recovering from a failure of an information handling system, comprising:

a memory suitable for storing a program of instructions; and a processor communicatively coupled to the memory, wherein the program of instructions configures the processor to monitor the information handling system, the information handling system being operational and utilizing at least one item of software;

monitor the at least one item of software;

detect failure of the at least one item of software utilized by the information handling system, wherein the failure of the at least one item of software is detected utilizing a BIOS level monitoring component of a recovery utility;

initiate an application level component of the recovery utility to correct the detected failure; and detect whether the application level component of the recovery utility failed to correct the detected failure;

wherein if the initiated application level component of the recovery utility is at least one of unsuccessful in correcting the detected failure and unavailable, initiating a BIOS level recovery component of the recovery utility to begin a recovery process.

12. The system as described in claim 11, wherein if the application level component is unavailable, the initiated BIOS level recovery component of the recovery utility initiates a file system rewrite.

13. The system as described in claim 12, wherein the file system rewrite includes a scorched earth recovery.

14. The system as described in claim 13, wherein files are obtained for the file system rewrite from at least one of a network connection and removable medium.

15. The system as described in claim 14, wherein a network connection to obtain the files is initiated by data stored in a host protected area accessible to the BIOS level recovery component.

16. The system as described in claim 11, wherein if the application level component is unsuccessful, the initiated BIOS level recovery component of the recovery utility initiates a file content replacement.

17. The system as described in claim 11, wherein the application level component is suitable for repairing applications including at least one of an operating system and a program designed to assist in performance of a specific task.

18. The system as described in claim 11, wherein the BIOS level recovery component is suitable for functioning in absence of a functioning operating system on the information handling system.

19. The system as described in claim 11, wherein correcting includes at least one of shutting down the failed item of software, reinstalling the item of software, restoring the item of software and restarting the item of software.

20. The system as described in claim 11, wherein the monitoring the at least one item of software is performed by the BIOS level monitoring component of the recovery utility.

21. A system for recovering from a failure of an information handling system, comprising:

means for monitoring an operational information handling system, the information handling system utilizing at least one item of software;

means for monitoring at least one item of software;

means for detecting failure of the at least one item of software utilized by the information handling system, said means for detecting comprising a BIOS level monitoring means;

means for initiating an application level means for software recovery to correct the detected failure;

means for detecting whether the application level means for software recovery utility failed to correct the detected failure; and means for initiating a BIOS level means for software recovery if the initiated application level software recovery means is at least one of unsuccessful in correcting the detected failure and unavailable.

22. The system as described in claim 21, wherein the application level software recovery means is suitable for repairing applications including at least one of an operating system and a program designed to assist in performance of a specific task.

23. The system as described in claim 21, wherein the BIOS level recovery means is suitable for functioning in absence of a functioning operating system.

* * * * *